(12) United States Patent
Bode

(10) Patent No.: US 7,824,796 B1
(45) Date of Patent: Nov. 2, 2010

(54) BATTERY RECEPTACLE

(75) Inventor: John Bode, Derby, KS (US)

(73) Assignee: BRG Precision Products, Inc., Derby, KS (US)

(*) Notice: Subject to any disclaimer, the term of this patent is extended or adjusted under 35 U.S.C. 154(b) by 957 days.

(21) Appl. No.: 11/620,495

(22) Filed: Jan. 5, 2007

(51) Int. Cl.
*H01M 2/00* (2006.01)

(52) U.S. Cl. ................... 429/163; 429/96; 429/99; 429/100

(58) Field of Classification Search .............. 429/163
See application file for complete search history.

(56) References Cited

U.S. PATENT DOCUMENTS

| | | | | |
|---|---|---|---|---|
| 3,920,478 A | * | 11/1975 | Kozawa | 429/206 |
| 5,296,315 A | * | 3/1994 | Rein | 429/100 |
| 5,622,789 A | * | 4/1997 | Young | 429/7 |
| 6,507,170 B2 | * | 1/2003 | O'Neill et al. | 320/107 |
| 2003/0162083 A1 | * | 8/2003 | Sakuma et al. | 429/61 |

* cited by examiner

*Primary Examiner*—Dah-Wei D Yuan
*Assistant Examiner*—Patricia Davis
(74) *Attorney, Agent, or Firm*—Neal, Gerber & Eisenberg LLP

(57) ABSTRACT

A battery receptacle for receiving a plurality of batteries for providing a direct current to an electrical device is disclosed. The battery receptacle has a plurality of battery slots each defined by a positive terminal end wall, a negative terminal end wall, and a battery support surface between each positive terminal end wall and each negative terminal end wall. Each positive terminal end wall supports a positive lead for engagement with a positive terminal of each of the plurality of batteries, and each negative terminal end wall supports a negative lead for engagement with a negative terminal of each of the plurality of batteries. Each of a plurality of diodes are coupled to each of the positive leads and to a common positive device lead, and each of the negative leads are coupled to a common negative device lead, for connecting the plurality of batteries in parallel to provide the direct current to the electrical device and for reducing any reverse current from any one of the plurality of batteries to another of the plurality of batteries when the plurality of batteries are placed in the first and second battery slots.

13 Claims, 4 Drawing Sheets

BATTERY RECEPTACLE

FIELD OF THE INVENTION

This invention generally relates to battery receptacles. More specifically, this invention relates to a multi-battery receptacle configuration which is safer and more efficient in maximizing the life of batteries placed therein.

BACKGROUND OF THE INVENTION

Some small devices such as clocks require voltage that can be provided from a single cell or battery, which is typically 1.5 volts. However, most small battery powered devices now use two or more batteries arranged in a series electrical configuration to produce a higher voltage than is available from a single cell or battery. Past attempts to extend the operating time of battery powered devices used multi-battery receptacles which placed the batteries in a parallel electrical configuration. For example, U.S. Patent Application Publication No. US 2002/0036480 A1 to O'Neill et al. discloses a battery pack having two or more battery slots formed to receive standard-sized batteries in parallel electrical communication. However, there are problems associated with this configuration. If one or more batteries drain at a different rate than the other batteries in the circuit, then the batteries with the higher voltage will send current into the batteries with a lower voltage. The resulting reverse current will effectively charge primary batteries that are not designed to be charged. Reverse current through a primary battery may cause battery leakage, fire, and possibly even an explosion.

One prior method of addressing these deficiencies is to attempt to carefully match the multiple batteries to make sure each has similar characteristics in order to reduce the chance of voltage differences. Nonetheless, significant leakage can still occur, as well as fire and even an explosion. Another past attempt to prevent fire and potential explosion is to manufacture the batteries with internal fuses. Batteries with internal fuses may assist in resolving these deficiencies, but only as long as the each battery is not defective. If a battery is defective, and presents a low resistance as compared to other batteries in the circuit, then reverse current flow is likely to occur, and similar deficiencies will result.

In the past, diodes have been used within automobiles to isolate automotive batteries in multiple battery configurations. Multiple automobile batteries are typically used in electric and hybrid cars, as well as within some diesel trucks, for better cranking power on ignition. These arrangements are not applicable to smaller devices using multi-battery receptacles, and would present significant problems in implementation within smaller devices requiring multiple batteries for extended life of the device, and requiring little or no reduction in battery voltage.

The present invention is provided to solve these and other problems.

SUMMARY OF THE INVENTION

The present invention is directed to a battery receptacle for receiving a plurality of batteries for providing a direct current to an electrical device. The electrical device can be a toy, a game, a clock, a flashlight, a tool, a measurement device, a household appliance, an audio device, a visual device, or some other device which may require or utilize multiple batteries for powering such electrical device. In one embodiment, the battery receptacle has a first battery slot defined by a first positive terminal end wall, a first negative terminal end wall, and a first battery support having a first battery support surface for supporting one of the plurality of batteries and located between the first positive terminal end wall and the first negative terminal end wall. The first positive terminal end wall supports a first positive lead for engagement with a positive terminal of one of the plurality of batteries, and the first negative terminal end wall supports a first negative lead for engagement with a negative terminal of the one of the plurality of batteries. The battery receptacle also has a second battery slot defined by a second positive terminal end wall, a second negative terminal end wall, and a second battery support having a second battery support surface for supporting another of the plurality of batteries and located between the second positive terminal end wall and the second negative terminal end wall. The second positive terminal end wall supports a second positive lead for engagement with a positive terminal of another of the plurality of batteries, and the second negative terminal end wall supports a second negative lead for engagement with a negative terminal of another of the plurality of batteries.

The battery receptacle also has a first diode coupled to the first positive lead and to a common positive device lead, and a second diode coupled to the second positive lead and to the common positive device lead. The first and second negative leads are coupled to a common negative device lead, for connecting the plurality of batteries in parallel. The battery receptacle provides the direct current to the electrical device in a manner that reduces any reverse current from any one of the plurality of batteries to another of the plurality of batteries when the plurality of batteries are placed in the first and second battery slots. Additional battery slots, diodes and respective elements may be implemented to increase the number of batteries which can be used in parallel within the battery receptacle.

In various embodiments, the battery receptacle can be integrally constructed with the electrical device or can be constructed separate from the electrical device and used a part for implementation into and/or with an electrical device. In addition, the battery supports can connect the positive terminal end walls to the negative terminal end walls. Further, the diodes can be Schottky diodes and the present invention can take advantage of the Schottky diodes to eliminate voltage drop associated with other diode types.

In another embodiment, the first and second diodes are constructed on or as an integral part of a substrate through processes understood by one of ordinary skill in the art. Each diode has a battery connection terminal and a device connection terminal. In one embodiment, a plurality of the diodes are provided on a single substrate and are each coupled to the respective connection terminals formed on either side of the substrate. In another embodiment, a plurality of the diodes are formed and provided within a single substrate. In both embodiments, the substrate can have one or more joining leads for coupling the device connection terminals of each of the diodes together. The substrate can be inserted within the battery slots for coupling the device connection terminals to the positive leads. The battery receptacle can have a battery separator connected to the first and second battery support surfaces. For a battery receptacle having one or more battery separators, the substrate can include a recess(es) between the diodes for receiving the battery separator(s).

In another embodiment, the positive terminal end walls each have a substrate region having a diode formed therein. The substrate regions and the diodes have a first positive lead or battery connection terminal for engagement with a positive terminal of one of the plurality of batteries. The diodes each have a connection terminal opposed to the respective positive leads, and the connection terminals are coupled to a positive device lead for connecting the plurality of batteries in parallel to provide the direct current to the electrical device. Again, the substrate can have a joining lead for coupling each of the connection terminals together.

In a further form of the present invention, an electrical device is provided. The electrical device has a housing, a DC current receiving portion, such as a DC motor or other current receiving device, and a battery receptacle. The battery receptacle receives a plurality of batteries for providing a direct current to the DC current receiving portion. The battery receptacle has a plurality of battery slots each defined by a positive terminal end wall having a substrate region with a diode formed therein, the each battery slot further defined by a negative terminal end wall and a battery support surface between the respective positive terminal end wall and the negative terminal end wall. Each substrate region and diode has a positive lead for engagement with a positive terminal of one of the plurality of batteries. Each negative terminal end wall supports a negative lead for engagement with a negative terminal of each battery used within the receptacle. The diodes each have a respective connection terminal opposed to the positive leads, and each connection terminal is coupled to a positive device lead for connecting the batteries in parallel to provide direct current to the DC receiving portion, for reducing any reverse current from any one of the batteries to another of the batteries when the batteries are placed in the receptacle, and for preventing charging of the batteries from any external source. In one embodiment, each of the substrate regions are constructed as a part of a single substrate and each of the diodes are constructed within the single substrate. Again, the substrate can have a joining lead for coupling each of the connection terminals together.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE DRAWINGS

Figure 1:
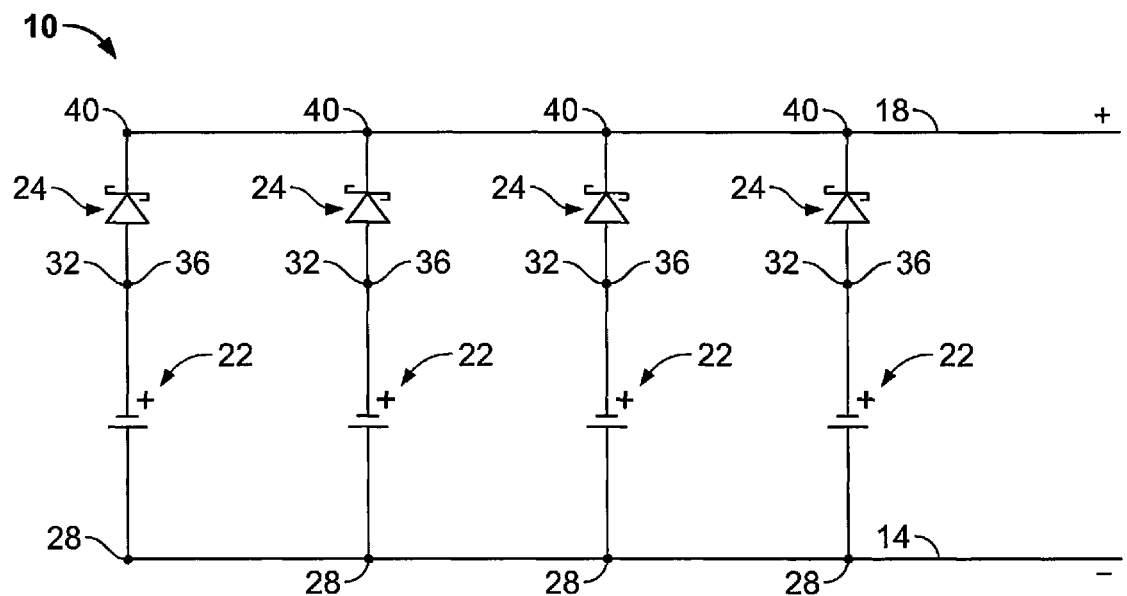
FIG. 1 is a schematic circuit diagram of one embodiment of the battery receptacle of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Typical electrical devices such as clocks, flashlights, radios, toys, games, tools, measurement devices, household appliances, audio/visual devices, and other devices are powered by a plurality of batteries. Generally, these devices are powered by conventional, commercially-available, sized/typed batteries, including but not limited to A, AA, AAA, D-cell, 9 volt, C-cell batteries and other batteries. According to the present invention, a battery receptacle pack can hold a plurality of conventional batteries, and the plurality of batteries can be inserted therein for powering the electrical device. The receptacle is formed to receive batteries to be electrically coupled in a parallel circuit, with diode isolation between the batteries.

When the power-consuming or electrical device draws power from two or more batteries at the same time, the power supplied to the electrical device will power the electrical device for a longer time than fewer batteries of the same voltage. Therefore, the time between battery replacement is increased. Diodes can be used to isolate the batteries from one another to prevent reverse current flow. The isolation prevents one cell from being charged by any other cell or cells, or charging from an outside source. Diode isolation allows a variety of battery configurations that would otherwise be problematic in a parallel battery configuration. For example, a four cell battery holder or receptacle could contain one Alkaline, one Lithium, one Carbon, and one depleted battery. This battery configuration would supply the desired voltage with significantly reduced potential for incident. Further, one or more batteries can be reversed with no adverse interaction between batteries. The diode isolation prevents any battery from affecting any other battery in the circuit.

In a preferred embodiment of the present invention, Schottky diodes can be used for battery isolation. Schottky diodes are semiconductor diodes with a low forward voltage drop and a very fast switching action. While standard silicon diodes have a forward voltage drop of about 0.6 v and germanium diodes 0.2 v, Schottky diodes voltage drop at forward biases of around 1 mA is in the range 0.15V to 0.45 V. A Schottky diode uses a metal-semiconductor junction as a Schottky barrier (instead of as in conventional diodes). This Schottky barrier results in both very fast switching times and low forward voltage drop. It is often said that the Schottky diode is a "semiconductor device." This means that if the semiconductor body is N-type, only the N-type carriers (mobile) play a significant role in normal operation of the device. The majority carriers are quickly injected into the conduction band of the metal contact on the other side of the diode to become free moving electrons. Therefore no slow, random recombination of N- and P-type carriers is involved, so that this diode may cease conduction faster than an ordinary PN rectifier. Commonly encountered Schottky diodes include the 1N5817 series 1 A rectifiers. In one embodiment of the present invention, 1N5819 series diodes are used.

Referring to FIG. 1, a battery receptacle circuit 10 for a four battery receptacle is shown. The battery receptacle circuit 10 has a negative device lead 14 and a positive device lead 18 for coupling the battery receptacle circuit 10 to a DC current receiving device, such as a motor, light, or other DC current receiving device, for powering the electrical device. The receptacle circuit 10 has a plurality of batteries 22 and a plurality of diodes 24, as shown. Each battery has a negative terminal 28 and a positive terminal 32, and each of the diodes 24 has a battery connection terminal 36 and a device connection terminal 40. The negative terminal 28 of each of the batteries 22 is coupled to the negative device lead 14. The device connection terminal 40 of each of the diodes 24 is coupled to the positive device lead 18. The positive terminal 32 of each of the batteries is coupled to the battery connection terminal 36 of each of the diodes 24, for connecting each battery and respective connected diode in series, and for connecting each battery/diode series combination in parallel, as shown.

Figure 2:
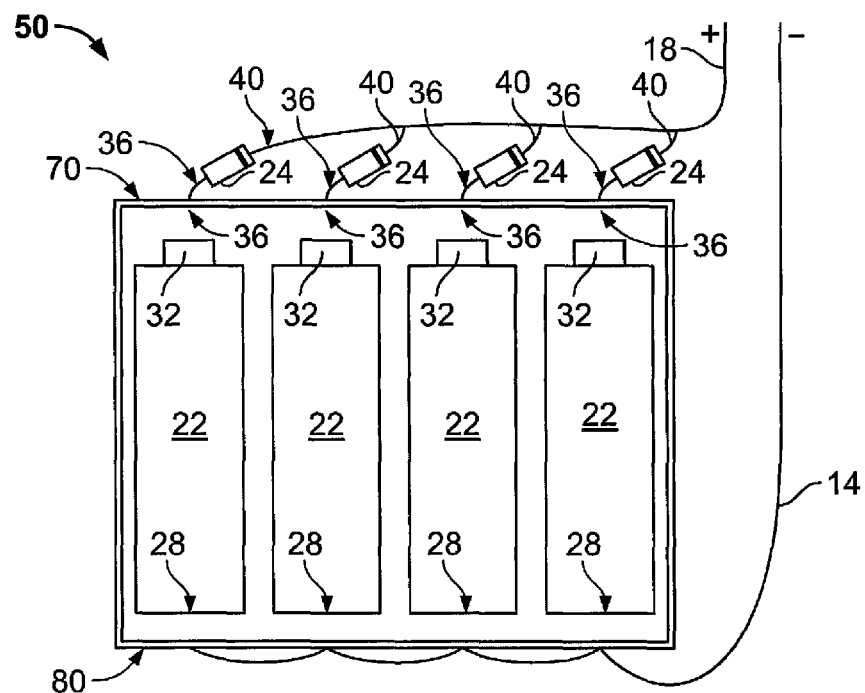
FIG. 2 is a top view of one embodiment of the battery receptacle of the present invention.

Referring to FIG. 2, a battery receptacle 50 implementing the battery receptacle circuit of FIG. 1 is shown. The battery receptacle 50 can be formed within a housing of the electrical device, or as a separate device. The battery receptacle 50 has a negative device lead 14 and a positive device lead 18 for coupling the battery receptacle circuit 50 to a DC current receiving device, such as a motor, light, or other DC current receiving device, for powering the electrical device. The battery receptacle 50 is provided for receiving a plurality of batteries 22 and includes a plurality of diodes 24. Each battery has a negative terminal 28 and a positive terminal 32, and each of the diodes 24 has a battery connection terminal 36 and a device connection terminal 40. The negative terminal 28 of each of the batteries 22 is coupled to the negative device lead 14. The device connection terminal 40 of each of the diodes 24 is coupled to the positive device lead 18. The positive terminal 32 of each of the batteries is coupled to the battery connection terminal 36 of each of the diodes 24, for connecting each battery and respective connected diode in series, and for connecting each battery/diode series combination in parallel, as shown.

Figure 4:
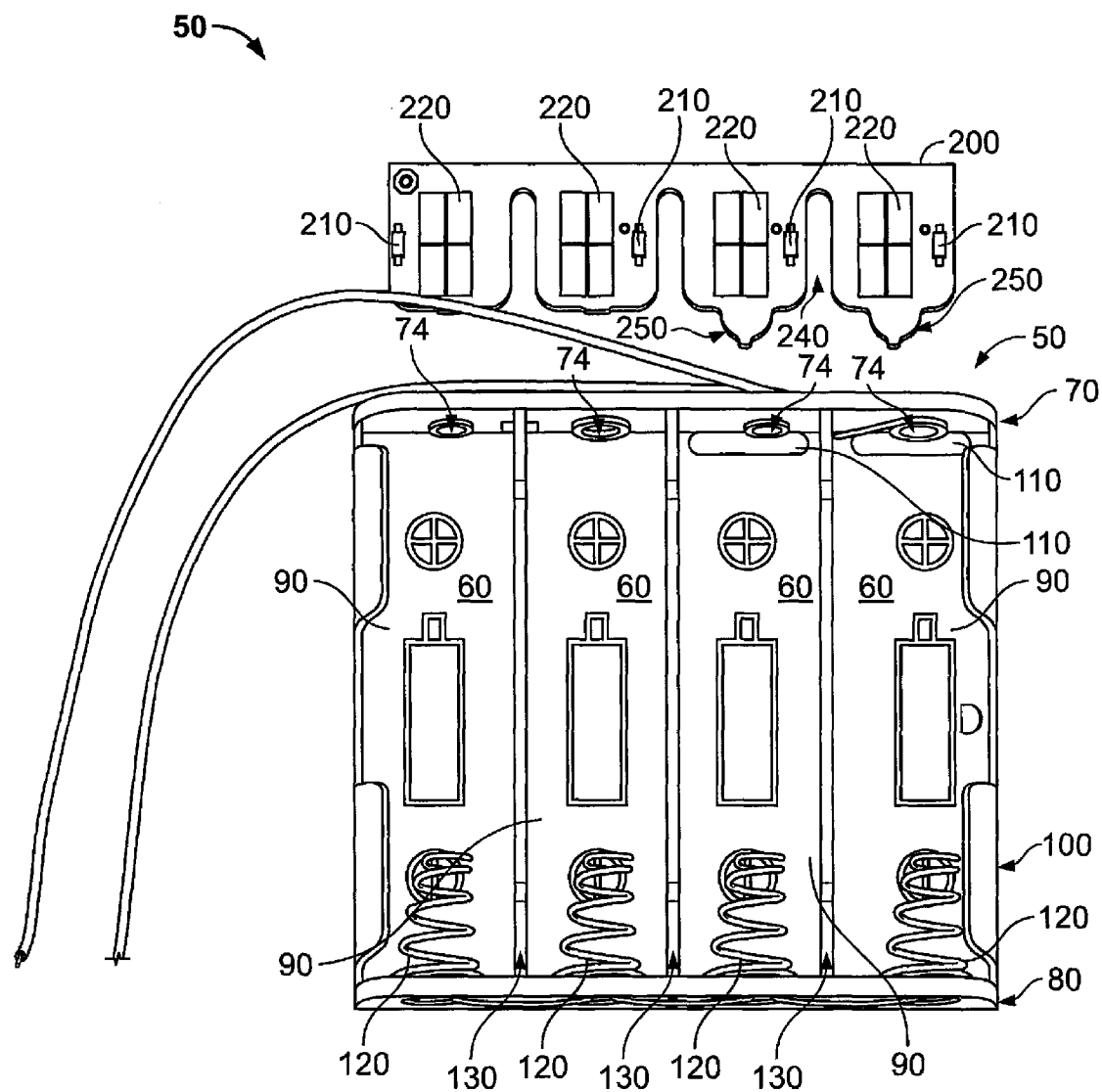
FIG. 4 is a top view of one embodiment of a multi-battery receptacle configured to receive the multi-diode substrate of FIG. 3, as well as a top view of the multi-diode substrate of FIG. 3 next to the multi-battery receptacle; and, FIG. 5 is an exploded, perspective view of the multi-battery receptacle of FIG. 4, as well as the multi-diode substrate of FIG. 3.

Referring additionally to FIG. 4, in one embodiment, the battery receptacle 50 has a plurality of battery slots 60 each defined by a positive terminal end wall 70, a negative terminal end wall 80, and a plurality of battery supports 90 each having a battery support surface 90 for supporting batteries inserted within the slots 60 and located between the positive terminal end wall 70 and the negative terminal end wall 80. Each positive terminal end wall 70 supports a positive lead 74 for engagement with a positive terminal 32 of a battery 22 inserted in each respective slot. In one embodiment, each positive lead 74 is a metallic button inserted within a respective bore within the respective positive terminal end wall 70. Other positive leads can alternatively be used within and supported by the positive terminal end walls 70. In one embodiment, the end walls 70, 80 and the supports 90 can be integral within a unitary receptacle housing 100. In other embodiments, the end walls 70, 80 and the supports 90 can be separated and connected together directly or indirectly through other elements. One or more supports 90 can have a socket 110 for insertion of a portion of the substrate 200 therein, as will be explained in greater detail below.

Likewise, each negative terminal end wall 80 supports a negative lead 120 for engagement with a negative terminal 28 of each of the batteries inserted within the slots 60. As shown in FIG. 4, the negative leads 120 are coil springs which, in addition to being a part of the battery receptacle circuit 10 of FIG. 1, are used to place pressure on the batteries 22 when inserted within the slots 60 for making sure there are good electrical connections and couplings with the respective battery, receptacle, and diode terminals, and for preventing the batteries 22 from easily being removed from or falling out of such slots 60. Other types of negative leads 120 may be used as well.

As explained above, in the embodiment of FIG. 2, the battery receptacle 50 has a plurality of diodes 24 coupled to respective positive leads or terminals of the diodes 24 or batteries 32 and to a common positive device lead 18. When batteries 22 are inserted in the slots 60, the battery receptacle 50 provides direct current to the electrical device in a manner which reduces any reverse current from any one of the plurality of batteries to another of the plurality of batteries. In one embodiment, the battery receptacle 50 may be integrally constructed with the electrical device. Alternatively, the battery receptacle 50 may be constructed separate from the electrical device and used as piece part for implementation into and/or with an electrical device.

As mentioned above, the battery receptacle 50 may be of a unitary construction such that the battery supports 90 directly connect the positive terminal end walls 70 to the negative terminal end walls 80. As shown in FIG. 4, the positive terminal end walls 70 form a unitary positive terminal end wall 70, and likewise the negative terminal end walls 70 form a unitary negative terminal end wall 70, although each of the end walls may also be separated from each other for each slot 60. The battery receptacle 50 may also have a plurality of battery separators 130 for separating each of the batteries 22 (and slots 60) when the batteries are inserted within the battery receptacle 50. Each separator 130 is connected at one end to the positive terminal end walls 70 and at the other end to the negative terminal end walls 80, and at their base to the respective support surfaces 90.

Figure 3:
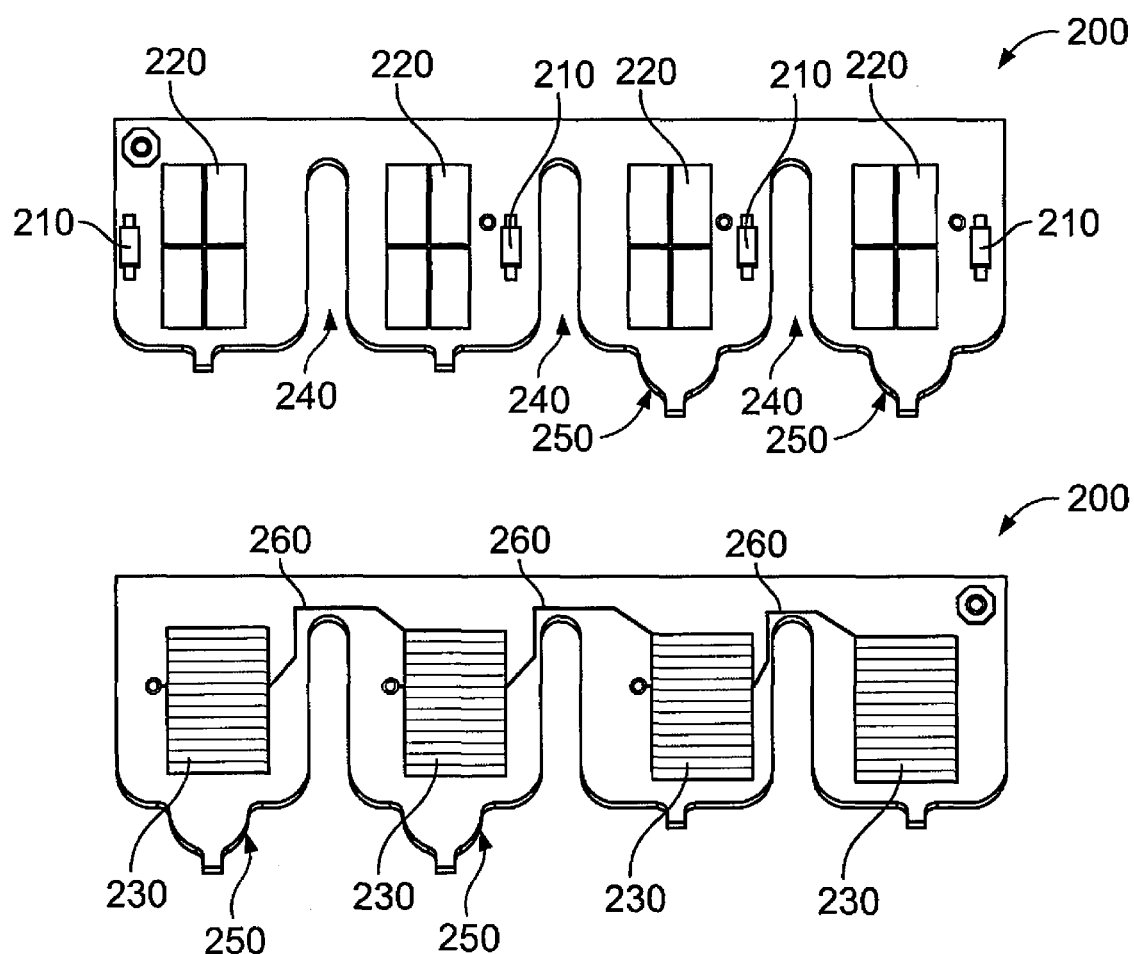
FIG. 3 is a top and bottom view of one embodiment of a multi-diode substrate for use within one embodiment the battery receptacle of the present invention.
Figure 5:
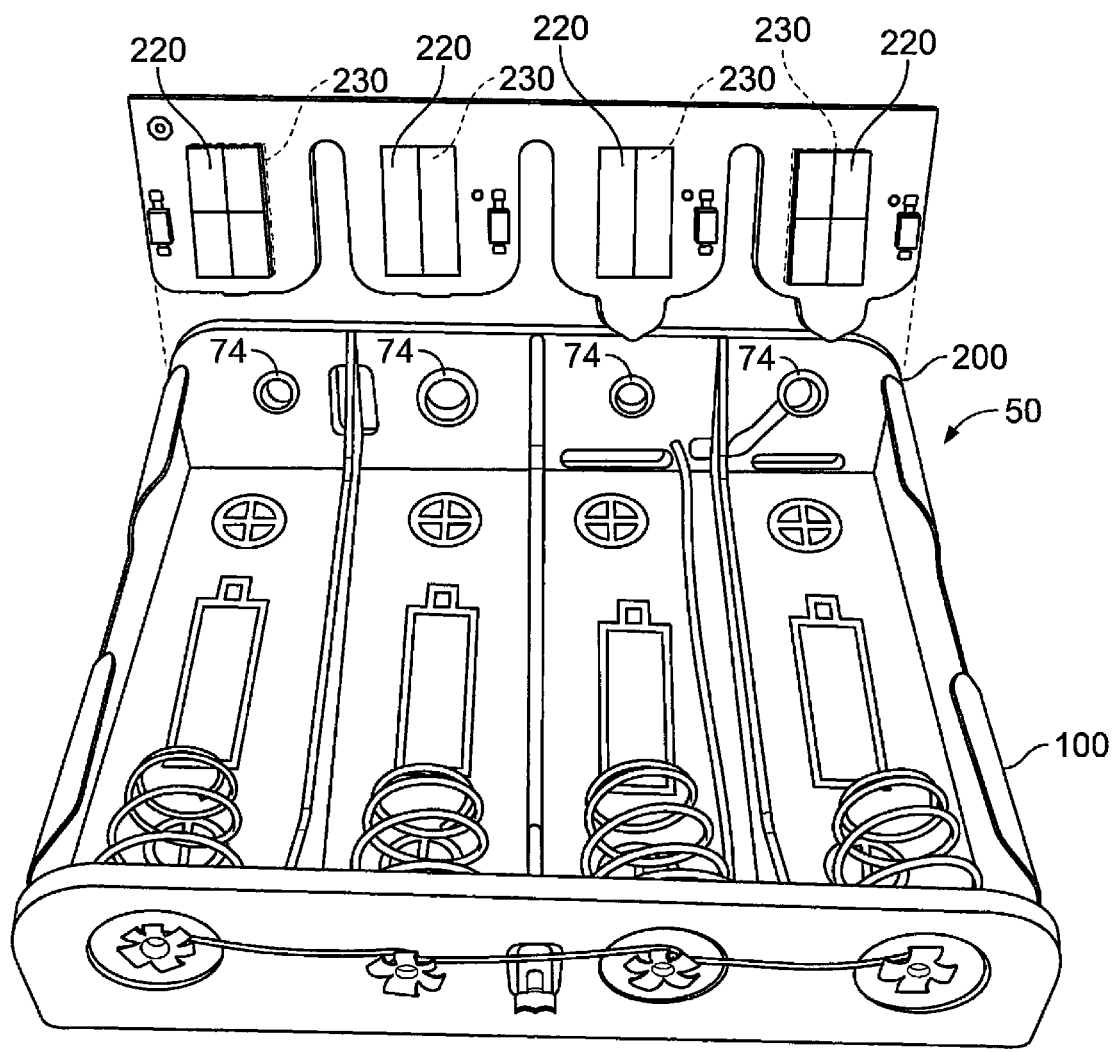

Referring to FIGS. 3 and 4, in one embodiment, the diodes are constructed on or within a substrate 200. The substrate 200 is constructed to include a battery connection terminal 220 on one side of the substrate 200 and a device connection terminal 230 on the other side of the substrate 200, for each of the diodes 210. In one embodiment, a plurality of the diodes 210 are provided on the substrate 200 and are each coupled to the respective connection terminals 220, 230 formed on either side of the substrate. Alternatively, the diodes 210 can be formed within the substrate through various integrated circuit and/or thin film techniques and processes, as understood by one of ordinary skill in the art. Each diode 210 region, including the respective connection terminals 220, 230, can be manufactured separately or manufactured on a single substrate and cut into separate regions. Alternatively, the diodes 210 and the respective connection terminals 220, 230 can be constructed and laid out on a single substrate 200, and the substrate can be cut so that the substrate and respective diode regions therein will fit into the battery receptacle 50. Specifically, the diodes 210 and the respective connection terminals 220, 230 can be laid out on the substrate so that one diode 210 and respective connection terminals 220, 230 fit snugly within each slot, and such that the connection terminals 220, 230 for each diode 210 align with the positive terminals of each battery and of the battery receptacle. Further, recesses 240 can be cut or formed into the substrate between each diode 210/diode region for receiving each of the separators 130 when the substrate 200 is inserted within the battery receptacle 50 for further establishing a snug fit. In addition, the substrate 200 can be cut or formed to create extensions 250. In the embodiment shown, the extensions 250 are semicircular, but may take other shapes. When the substrate 50 is inserted within the battery receptacle 50, as shown in FIG. 5, the extensions 250 are inserted in and fit within the sockets 110 shown in FIG. 4. The semi-circled shape of the extensions make it easy for such extensions to slide into the sockets 110. As mentioned, the diodes 210 can be formed within a single substrate 200. In such an arrangement, the substrate 200 may also be formed to have a joining lead 260 between each of the diodes 210, shown in FIG. 3, for coupling the device connection terminals 230 of each of the diodes 210/diode regions together. When the substrate 200 is inserted within the battery slots 60, the joining leads 260 may couple the device connection terminals 230 for each of the diodes 210 to the positive device lead 18, directly or indirectly through other leads or terminals. An adhesive (not shown) can be used to keep the substrate 200 connected to the battery receptacle housing 100. The adhesive can be placed or positioned in one or more locations, such as between the terminals of the receptacle and the connection terminals 230 of the substrate 200 for preventing the substrate 200 from falling out of the receptacle and for keeping a good electrical connection between the terminals of receptacle and the connection terminals 230 of the substrate 200. It should be understood that other manners of retaining substrate 200 within the receptacle may also be implemented, such as with clip or other retaining means.

In one embodiment where each diode 210 is provided on the substrate 200, the diodes 210 can be positioned proximate the battery connection terminal 220. The diodes 210 protrude from the surface of the substrate 200 proximate the battery connection terminal 220. However, when the positive terminal of a battery contacts the battery connection terminal 220, there is sufficient clearance between the perimeter of the positive terminal of the battery and the diode 210 so the perimeter of the positive terminal of the battery does not touch the diode 210, and a good connection can be achieved between the battery connection terminal 220 and the positive terminal of the battery. In addition, if by mistake a battery is inserted into a battery slot of the battery receptacle in the wrong direction, attempting to connection the negative terminal of the battery to the battery connection terminal 220 of the substrate 200, a plastic or other non-conducting exterior shell of the diode 210 protruding from the substrate will engage the negative terminal of the battery and will prevent a circuit from being completed.

In another embodiment, the positive terminal end walls 70 each have a substrate region integral with each positive terminal end wall 70, similar to each diode 210 within the substrate 200 shown in FIGS. 3 and 4, having a diode formed thereon or therein. The diode/substrate regions and the diodes each have a positive lead or battery connection terminal for engagement with a positive terminal of one of the plurality of batteries, similar to the diodes 210/diode regions shown in FIGS. 3 and 4. The diodes 210/diode regions each have a connection terminal opposed to the respective positive leads, similar to that shown in FIG. 3. The connection terminals are coupled to the positive device lead 18 for connecting the plurality of batteries in parallel to provide the direct current to the electrical device. Again, in this embodiment, the substrate can have a joining lead for coupling each of the connection terminals together, similar to the substrate 200 shown in FIG. 3. In this arrangement, the positive device lead 18 can attached to any one of the device connection terminals of the diodes.

It should be emphasized that the above-described embodiments of the present invention are examples of implementations, and are merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and by the following claims.

What is claimed is:

1. A battery receptacle for receiving a plurality of batteries for providing a direct current to an electrical device, comprising:
    a first battery slot defined by a first positive terminal end wall, a first negative terminal end wall, and a first battery support surface between the first positive terminal end wall and the first negative terminal end wall, the first positive terminal end wall supporting a first positive lead for engagement with a positive terminal of one of the plurality of batteries, the first negative terminal end wall supporting a first negative lead for engagement with a negative terminal of the one of the plurality of batteries;
    a second battery slot defined by a second positive terminal end wall, a second negative terminal end wall, and a second battery support surface between the second positive terminal end wall and the second negative terminal end wall, the second positive terminal end wall supporting a second positive lead for engagement with a positive terminal of another of the plurality of batteries, the second negative terminal end wall supporting a second negative lead for engagement with a negative terminal of the another of the plurality of batteries, wherein the first and second negative leads are coupled to a common negative device lead;
    a first diode coupled to the first positive lead and to a common positive device lead; and,
    a second diode coupled to the second positive lead and to the common positive device lead, for connecting the first diode together with the one of the plurality of batteries and the second diode together with the another of the plurality of batteries in parallel between the common positive lead and the common negative lead to provide the direct current to the electrical device and for reducing any reverse current from any one of the plurality of batteries to another of the plurality of batteries when the plurality of batteries are placed in the first and second battery slots.

2. The battery receptacle of claim 1 wherein the battery receptacle is integrally constructed with the electrical device.

3. The battery receptacle of claim 1 further comprising:
    a first battery support having the first battery support surface for supporting the one of the plurality of batteries, wherein the first battery support connects the first positive terminal end wall to the first negative terminal end wall; and,
    a second battery support having the second battery support surface for supporting the another of the plurality of batteries, wherein the second battery support connects the second positive terminal end wall to the second negative terminal end wall.

4. The battery receptacle of claim 1 wherein the first and second diodes are Schottky diodes.

5. The battery receptacle of claim h wherein each of the first and second diodes are constructed on a substrate, wherein each of the first and second diodes has a battery connection terminal and a device connection terminal, and wherein the single substrate comprises a joining lead for coupling the device connection terminals of each of the first and second diodes together.

6. The battery receptacle of claim 5 wherein the single substrate is inserted within the first and second battery slots, and wherein the device connection terminals are coupled to the first and second positive leads.

7. The battery receptacle of claim 5 further comprising a battery separator connected to the first and second battery support surfaces, wherein the substrate comprises a recess between the first and second diodes for receiving the battery separator.

8. A battery receptacle for receiving a plurality of batteries for providing a direct current to an electrical device, comprising:
    a first battery slot defined by a first positive terminal end wall comprising a first substrate region having a first diode formed therein, the first battery slot further defined by a first negative terminal end wall and a first battery support surface between the first positive terminal end wall and the first negative terminal end wall, the first substrate region and the first diode having a first positive lead for engagement with a positive terminal of one of the plurality of batteries, the first negative terminal end wall supporting a first negative lead for engagement with a negative terminal of the one of the plurality of batteries; and, a second battery slot defined by a second positive terminal end wall comprising a second substrate region having a second diode formed therein, the second battery slot further defined by a second negative terminal end wall and a second battery support surface between the second positive terminal end wall and the second negative terminal end wall, the second substrate region and the second diode having a second positive lead for engagement with a positive terminal of another of the plurality of batteries, the second negative terminal end wall supporting a second negative lead for engagement with a negative terminal of the another of the plurality of batteries, wherein the first and second negative leads are coupled to a common negative device lead;

wherein the first and second diodes have respective first and second connection terminals opposed to the respective first and second positive leads, wherein the first and second connection terminals are coupled to a positive device lead for connecting the first diode together with the one of the plurality of batteries and the second diode together with the another of the plurality of batteries in parallel to provide the direct current to the electrical device and for reducing any reverse current from any one of the plurality of batteries to another of the plurality of batteries when the plurality of batteries are placed in the first and second battery slots.

9. The battery receptacle of claim 8 wherein each of the first and second substrate regions are constructed as a part of a single substrate and wherein each of the first and second diodes are constructed within the single substrate.

10. The battery receptacle of claim 8 wherein the single substrate comprises a joining lead for coupling each of the first and second connection terminals together.

11. The battery receptacle of claim 8 wherein the battery receptacle is integrally constructed with the electrical device.

12. The battery receptacle of claim 8 wherein the first and second diodes are Schottky diodes.

13. The battery receptacle of claim 8 wherein the electrical device is one of at least a toy, a game, a flashlight, a clock, a tool, a measurement device, a household appliance, an audio device, and/or a visual device.

* * * * *